C. L. SOVEREIGN & A. W. H. LENDERS.
CONVERTING APPARATUS.
APPLICATION FILED JAN. 23, 1909.
948,485. Patented Feb. 8, 1910.
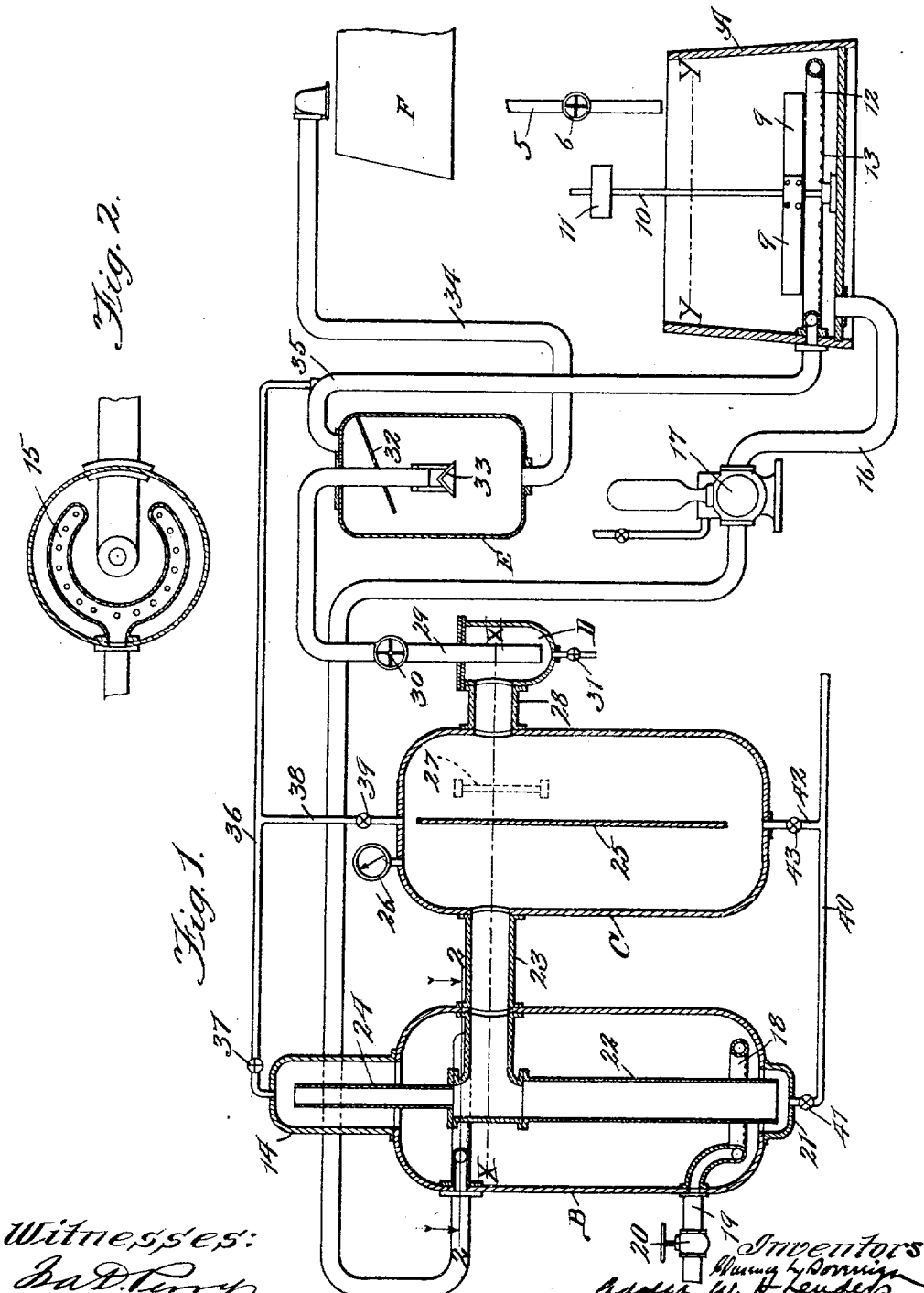

UNITED STATES PATENT OFFICE.

CLARENCE L. SOVEREIGN AND ADOLPH W. H. LENDERS, OF WAUKEGAN, ILLINOIS.

CONVERTING APPARATUS.

948,485. Specification of Letters Patent. Patented Feb. 8, 1910.

Application filed January 23, 1909. Serial No. 473,859.

*To all whom it may concern:*

Be it known that we, CLARENCE L. SOVEREIGN and ADOLPH W. H. LENDERS, citizens of the United States, residing at Waukegan, in the county of Lake and State of Illinois, have invented certain new and useful Improvements in Converting Apparatus, of which the following is a specification.

Our invention relates to apparatus for converting starch into glucose, sugar, syrup or other products of conversion, and has for its object to provide new and improved apparatus whereby the starch is converted continuously, instead of in batches.

In the process of converting starch as it has been practiced heretofore, the starch liquor, properly acidified, is introduced into a converting vessel partially filled with a priming water, which has been raised to a suitable temperature before the flow of starch begins. The introduction of the starch is continued until a certain level is reached, the liquor in the vessel being subjected to heat by the introduction of steam in the bottom of the converter, or by other suitable means, the converter being provided with a vent which is open during the filling period. The flow of starch is then shut off, the vent closed and the introduction of steam is continued until a desired pressure is reached, and until the proper degree of conversion is obtained. A blow-up pipe is then opened and the converted liquor forced by steam pressure into the neutralizer, where the acid used in the converting process is neutralized. This process has several disadvantages. There is a great waste of heat, caused by the escape of steam during the running in of the starch and at the neutralizer. The conversion in batches makes it difficult to get a uniform purity. Experience has shown that, where it is attempted to obtain a glucose having 40% dextrose, the different batches will frequently vary to the extent of 5% above or below this percentage. Moreover, conversion in batches makes a break in the continuity of the process of manufacture as a whole; it requires the use of large storage tanks for the starch before its conversion and for the crude product before it goes to the refining step. Constant attention and testing are required, in order to get even as uniform a product as is at the present day obtained by the common method of conversion. Furthermore, the draw of steam from the steam boilers is interrupted and unequal.

The object of our present invention is to provide suitable apparatus by means of which the starch is converted in an uninterrupted and continuously flowing stream, instead of in batches, and, furthermore, to save and utilize the steam escaping from the converter.

The invention has for further objects such new and useful improvements in converting apparatus as will be described in the following specification and particularly set forth in the claims appended thereto.

One form of apparatus suitable for the continuous conversion of starch into glucose and the like is shown in shown in the accompanying drawing, wherein—

Figure 1 is a longitudinal, sectional elevation of the apparatus; and Fig. 2 is a detail sectional plan taken on line 2—2 of the preceding figure.

Like characters of reference indicate like parts in both figures of the drawing.

The apparatus, as we have here shown it, consists of a plurality of connected converting vessels, heating means for initially heating the starch before it goes to the converters, and an expansion chamber which receives the converted liquor from the converters and from which the liquor goes to the neutralizer, while the separated vapor is conducted to the tank in which the starch is initially heated, together with a pump and the necessary pipe connections for making the flow through the apparatus continuous.

A represents the heating tank, which is supplied with starch through the pipe 5, provided with a valve 6, the starch having been first mixed with suitable acid water. Preferably the tank is provided with means for agitating the starch, so as to thoroughly break up the lumps and mix it with the acid water. For example, agitator blades 9 may be provided, which are mounted on the shaft 10, having the driving pulley 11. A steam ring 12, having perforations 13, is located in the bottom of the tank. Other means might be substituted for heating the liquor in the tank.

B and C are converting vessels, vessel B having preferably the steam dome 14 and being provided near the top with the perforated starch pipe 15, to which leads a pipe 16 from the tank A. A pump 17 is provided for pumping the liquor from tank A into vessel B.

In the bottom of the vessel B is the steam ring 18, supplied through a steam pipe 19 from any desired source of steam (not shown). A valve 20 is provided for controlling the supply of steam.

The vessel B is constructed preferably with a pot 21 at its lower end and from this a pipe 22 extends up through the vessel, a cross-pipe 23 leading from pipe 22 through the side of vessel B and into vessel C. A pipe 24, open at its upper end, extends up from pipe 23 into the steam dome 14.

The vessel C is provided with a central, vertical partition 25, which, however, does not reach quite to the top or bottom of the vessel. This second vessel may have the steam gage 26 and the water gage 27.

Connected with vessel C by a pipe 28 so as, in fact, to form a part thereof is what may be termed a blow-up pot D, although the flow of liquid out of this vessel is intended to be constant, under a constant pressure of steam, instead of intermittent, as in the blow-up pots in ordinary converting apparatus. From the bottom of the blow-up pot leads a pipe 29, in which is the discharge valve 30. The blow-up pot may have the test cock 31. Pipe 29 leads into the expansion chamber E, which is provided with the preferably oblique baffle plate 32, a deflector 33 being preferably arranged under the end of pipe 29. A liquor discharge pipe 34 leads from the bottom of chamber E to the neutralizer F. A vapor discharge pipe 35 leads from the top of expansion chamber E above the baffle plate into tank A, where it connects with the steam ring 12. A steam pipe 36 leads from the steam dome 14 to pipe 35, this pipe being provided with a valve 37. A steam pipe 38, having a valve 39, leads from the top of vessel C to pipe 36.

Vessel B may be provided with an emptying pipe 40, controlled by valve 41, into which may lead an emptying pipe 42 from vessel C, provided with the valve 43.

We do not wish to limit ourselves to the particular devices, constructions and arrangements shown and described, as modifications might be devised which would come within our invention as defined by the claims herein.

The operation of the apparatus above described is as follows: In starting up the apparatus, the priming water is first heated in tank A and then pumped into vessel B and the steam, through the steam ring 18, is turned on. The starch is then let into tank A and the agitator set in motion. After being mixed and heated in tank A, the liquor is pumped through pipe 16 into vessel B. From the bottom of vessel B, the liquor will pass through pipes 22 and 23 into vessel C, where it goes around under partition 25 and into the blow-up pot D. When the liquor reaches the level indicated by the line X—X, which is the normal level of the liquor, discharge valve 30, which heretofore has been closed, is opened and the liquor passes from the converting vessels into the expansion chamber E. Hereafter the operation of the apparatus is automatic and continuous. The acidulated starch is continuously supplied in regulatable quantities to tank A, so as to maintain the desired level Y—Y in this tank. From tank A the thoroughly mixed and initially heated liquor is pumped into vessel B in sufficient quantities to maintain the desired level in the converting vessels. It is heated to any desired temperature by means of the steam injected into the liquor from steam ring 18.

Any desired pressure may be maintained in the converting vessels. We preferably operate the apparatus at forty pounds pressure. This pressure is equal for both converting vessels and may be maintained by a proper regulation of valve 20. Valves 37 and 39 are left open during the filling step. When the apparatus is running continuously, these valves may be closed, or better still may be left slightly open so as to keep the converters free of air and allow the escape of small amounts of steam, which in the case of the first vessel, increases the agitation of the entering starch. The pressure in the expansion chamber E is intended to be comparatively low, for instance, the apparatus may be designed so that there will be but one pound pressure here. The vapor given off during the reduction of pressure from forty pounds to one pound escapes around the baffle plate 32 and is conducted by pipe 35 into the steam ring 13, where it is employed to initially heat the inflowing new liquor. In the arrangement shown, steam from the vents of the converting vessels is utilized in the same way. By these arrangements we are able to save a great deal of heat which heretofore has been wasted by the escape of steam during the running in of each batch of starch and when the starch was blown-up to the neutralizer.

The operation of the apparatus is continuous and requires very little attention after the converters have been initially filled with the liquor. Consequently a much more uniform grade of product is turned out than is possible by conversion in batches. After the apparatus has been started up, tests can be made by withdrawing liquor through the test cock 31 and, after the various valves have been set in accordance with such tests, the conversion will be perfectly uniform, since all the conditions are uniform.

The apparatus is preferably designed, as has been shown, so that, during the first part of its course through the converting vessels, the liquor is subjected to an agitation, while, during the latter part, its flow is very quiet. The relatively cool liquor is introduced into the upper part of the vessel B in a body of very hot steam. The flow through this vessel is somewhat circuitous and impeded. There is a continual boiling up of the liquor against its downward flow under the pressure of the steam. In vessel C the flow around partition 25 is very quiet, the object being to mix the parts of the current at different stages of conversion as little as possible toward the end of its course through the converters. The vapor spaces above the liquor line in the converting vessels are in communication so that a uniform pressure is maintained. The escape of steam through pipes 36 and 37 during the operation of the apparatus will not appreciably increase the pressure in pipe 35.

The operation of the apparatus has been described as employed in the manufacture of what is termed commercial glucose. Obviously, it is suitable for the manufacture of other allied conversion products derived from starch, of any sort, by hydrolysis.

We claim:

1. In converting apparatus, the combination of connected converting vessels, a starch heating tank, means for continuously introducing the starch from the heating tank to the first of the converting vessels, an expansion chamber, means for continuously introducing the converted liquor into the expansion chamber and for withdrawing it therefrom, and a vapor pipe leading from the expansion chamber to the heating tank.

2. In converting apparatus, the combination of connected converting vessels, a starch heating tank, means for continuously introducing the starch from the heating tank to the first of the converting vessels, an expansion chamber, means for continuously introducing the converted liquor into the expansion chamber and for withdrawing it therefrom, a vapor pipe leading from the expansion chamber to the heating tank, and steam pipes leading from each of the converting vessels, whereby steam may be conducted to the starch heating tank.

3. The combination with a closed converter, of means for continuously supplying the same with starch and for simultaneously and continuously withdrawing the product of the conversion from said converter, means for introducing steam into the converter in quantities sufficient to maintain a pressure therein above atmospheric pressure and means for separating the steam from the converted liquor as it is discharged from the converter.

4. The combination with a converter, of means for continuously supplying the same with starch, means for simultaneously and continuously withdrawing the product of the conversion from the converter, means for heating the starch before it is supplied to the converter, and means for separating the steam from the converted liquor as it comes from the converter and for conducting such steam to the means for heating the starch before it is supplied to the converter.

5. The combination with a closed converter, comprising a plurality of connected vessels, of means for maintaining steam in said vessels at pressure above atmospheric pressure, means for continuously supplying said converter with starch, and means for simultaneously and continuously withdrawing the product of such conversion from said converter and for separating the steam therefrom.

6. Converting apparatus, comprising a closed converter, means for maintaining a pressure in said converter above atmospheric pressure and an expansion chamber which receives the product of the conversion from the converter, the expansion chamber provided with a vapor discharge pipe and a separate liquor discharge pipe.

7. Converting apparatus, comprising a closed converter, means for maintaining a pressure in said converter above atmospheric pressure and an expansion chamber which receives the product of the conversion from the converter, said expansion chamber provided with a baffle plate, a vapor discharge pipe leading from the chamber above the baffle plate, and a liquor discharging pipe leading from the lower end of the expansion chamber.

8. Converting apparatus, comprising a converter, an expansion chamber which receives the product of the conversion from the converter, a starch heating tank, means for introducing the starch from the same into the converter, and a vapor discharge pipe leading from the expansion chamber to the starch heating tank.

9. Converting apparatus, comprising a converter, an expansion chamber which receives the product of the conversion from the converter, a starch heating tank, means for introducing the starch from the same into the converter, a vapor discharge pipe leading from the expansion chamber to the starch heating tank, and a steam pipe leading from the converter to said starch heating tank.

10. Converting apparatus, comprising a converter, a starch heating tank, means for conducting the starch from the heating tank to the converter, and means for taking steam from the converter to the heating tank.

11. Converting apparatus, comprising two connected converting vessels, means for introducing the starch into the first of said vessels, means for heating said liquor in said vessels, and means for withdrawing the product of the conversion from the second of said vessels.

12. Converting apparatus, comprising two connected converting vessels, means for introducing the starch into the first of said vessels, means for heating said liquors in said vessels and for agitating the liquors in the first vessel, and means for withdrawing the product of the conversion from the second of said vessels, the second of said vessels being so constructed as to give a relatively undisturbed flow.

13. Converting apparatus, comprising two converting vessels, means for introducing the starch into the top of the first vessel, means for heating the starch in the first vessel, means for withdrawing it from the bottom of the first vessel and introducing it into the second vessel, and means for withdrawing it from said second vessel.

14. Converting apparatus, comprising two connected converting vessels, means for introducing the starch into the first of said vessels, and a heating device associated with the first of said vessels, the second vessel being provided with a vertical partition, and an outlet beyond said partition.

15. Converting apparatus, comprising two converting vessels, a pipe leading from the bottom of the first vessel through the same and into the second vessel, a starch pipe in the upper end of the first vessel, means for injecting steam into the liquor in the bottom of the first vessel, a dividing partition in the second vessel, and means for withdrawing the liquor from said second vessel.

16. Converting apparatus, comprising a plurality of connected converting vessels, means for continuously supplying the liquor to be converted to the first of said vessels, means for continuously withdrawing the liquor from the last of said vessels, and an expansion tank which receives the liquor from the converting vessels, said expansion tank being provided with a vapor discharge and a liquor discharge.

17. Converting apparatus, comprising a plurality of connected converting vessels, means for continuously supplying the liquor to be converted to the first of said vessels, means for continuously withdrawing the liquor from the last of said vessels, an expansion tank which receives the liquor from the converting vessels, said expansion tank being provided with a vapor discharge and a liquor discharge, and a starch heating tank connected with the vapor discharge of the expansion tank.

18. Converting apparatus, comprising a plurality of connected converting vessels, means for continuously supplying the liquor to be converted to the first of said vessels, means for continuously withdrawing the liquor from the last of said vessels, an expansion tank which receives the liquor from the converting vessels, said expansion tank being provided with a vapor discharge and a liquor discharge, a starch heating tank connected with the vapor discharge of the expansion tank, and steam pipes whereby steam may be conducted from each of said converters to said starch heating tank.

19. Converting apparatus, comprising a converting vessel in which the starch is heated under pressure, a heating tank for heating the starch before it goes to the converter, an expansion chamber which receives the starch from the converter, and means for conducting steam from the expansion chamber to the starch heating tank.

20. Converting apparatus, comprising a converter in which the starch is heated under pressure, said converter having a steam vent, a heating tank for heating the starch before it goes to the converter, and a steam pipe leading from the steam vent of the converter to the heating tank.

21. Converting apparatus, comprising a plurality of closed converting vessels, means for continuously introducing acidulated starch liquor into the first of said vessels, and continuously withdrawing the product of conversion from the last of the same, means connecting said vessels so that the liquor flows from one to another, and so that the vapor spaces is said vessels are all in communication, and means for heating the liquor in the converting vessels and maintaining a pressure therein above atmospheric pressure.

22. In converting apparatus, the combination with a closed converter, of a feed pipe leading into said converter, means for maintaining pressure in said converter above atmospheric pressure, a blow-up pot connected with said converter, and an expansion tank connected with the blow-up pot and provided with a vapor discharge pipe and a separate liquor discharge pipe.

23. In converting apparatus, the combination with a closed converter, of a feed pipe leading into said converter, means for maintaining a pressure in said converter above atmospheric pressure, a discharge pipe extending upward from said converter and opening beneath the surface of the liquor therein, through which the converted liquor is discharged, and an expansion tank into which said discharge delivers, provided with a liquor discharge pipe and a separate vapor discharge pipe.

24. In converting apparatus, the combination with a plurality of closed connecting converting tanks, means for introducing starch continuously into the upper end of the first of said tanks, means for introducing steam into the lower end of the first of said tanks, and a discharge pipe extending upward from the last of said tanks from beneath the surface of the liquid therein, whereby the converted liquor in said tanks is continuously discharged therefrom.

25. In converting apparatus, the combination with a plurality of closed connected converting tanks, of an inlet pipe leading into the upper end of the first of said tanks, a steam pipe leading into the bottom of the first of said tanks, a blow-up pot connected with the last of said tanks, an expansion tank provided with a liquor discharge and a vapor discharge, and a discharge pipe leading from the blow-up pot beneath the surface of the liquor therein upwardly and into the expansion tank.

CLARENCE L. SOVEREIGN.
ADOLPH W. H. LENDERS.

Witnesses:
P. A. TRUMAN,
G. Y. SKINNER.

---

It is hereby certified that in Letters Patent No. 948,485, granted February 8, 1910, upon the application of Clarence L. Sovereign and Adolph W. H. Lenders, of Waukegan, Illinois, for an improvement in "Converting Apparatus," errors appear in the printed specification requiring correction as follows: Page 1, line 72, the words "in shown" should be canceled, and page 4, line 117, after the word "discharge" the word *pipe* should be inserted; and that the said Letters Patent should be read with these corrections therein that the same may conform to the record of the case in the Patent Office.

Signed and sealed this 1st day of March, A. D., 1910.

[SEAL.]

C. C. BILLINGS,
*Acting Commissioner of Patents.*

25. In converting apparatus, the combination with a plurality of closed connected converting tanks, of an inlet pipe leading into the upper end of the first of said tanks, a steam pipe leading into the bottom of the first of said tanks, a blow-up pot connected with the last of said tanks, an expansion tank provided with a liquor discharge and a vapor discharge, and a discharge pipe leading from the blow-up pot beneath the surface of the liquor therein upwardly and into the expansion tank.

CLARENCE L. SOVEREIGN.
ADOLPH W. H. LENDERS.

Witnesses:
P. A. TRUMAN,
G. Y. SKINNER.

---

It is hereby certified that in Letters Patent No. 948,485, granted February 8, 1910, upon the application of Clarence L. Sovereign and Adolph W. H. Lenders, of Waukegan, Illinois, for an improvement in "Converting Apparatus," errors appear in the printed specification requiring correction as follows: Page 1, line 72, the words " in shown" should be canceled, and page 4, line 117, after the word " discharge " the word *pipe* should be inserted; and that the said Letters Patent should be read with these corrections therein that the same may conform to the record of the case in the Patent Office.

Signed and sealed this 1st day of March, A. D., 1910.

[SEAL.]

C. C. BILLINGS,
*Acting Commissioner of Patents.*

It is hereby certified that in Letters Patent No. 948,485, granted February 8, 1910, upon the application of Clarence L. Sovereign and Adolph W. H. Lenders, of Waukegan, Illinois, for an improvement in "Converting Apparatus," errors appear in the printed specification requiring correction as follows: Page 1, line 72, the words "in shown" should be canceled, and page 4, line 117, after the word "discharge" the word *pipe* should be inserted; and that the said Letters Patent should be read with these corrections therein that the same may conform to the record of the case in the Patent Office.

Signed and sealed this 1st day of March, A. D., 1910.

[SEAL.]

C. C. BILLINGS,
*Acting Commissioner of Patents.*